United States Patent
Colombo et al.

(10) Patent No.: US 6,559,936 B1
(45) Date of Patent: May 6, 2003

(54) MEASURING ANGLES OF WHEELS USING TRANSITION POINTS OF REFLECTED LASER LINES

(75) Inventors: Flavio Colombo, Gallarate (IT); Alessandro Ratti, Como (IT)

(73) Assignee: Gieffe Immobiliare S.n.c. di Gianfranco Crosta & C., Varese (IT)

( * ) Notice: Subject to any disclaimer, the term of this patent is extended or adjusted under 35 U.S.C. 154(b) by 0 days.

(21) Appl. No.: 09/979,131

(22) PCT Filed: May 15, 2000

(86) PCT No.: PCT/IB00/00648

§ 371 (c)(1), (2), (4) Date: Feb. 1, 2002

(87) PCT Pub. No.: WO00/71972

PCT Pub. Date: Nov. 30, 2000

(30) Foreign Application Priority Data

May 19, 1999 (IT) .......................... MI99A1103

(51) Int. Cl.[7] .............................. G01B 11/26; G01B 5/24
(52) U.S. Cl. ...................................... 356/139.09; 33/288
(58) Field of Search ................. 356/139.09; 33/203.13, 33/203.18, 203.19, 288

(56) References Cited

U.S. PATENT DOCUMENTS

| | | |
|---|---|---|
| 4,899,218 A | 2/1990 | Waldecker et al. |
| 5,600,435 A | 2/1997 | Bartko et al. |
| 5,818,574 A * | 10/1998 | Jones et al. ............ 356/139.09 |
| 5,978,077 A * | 11/1999 | Koerner et al. ........ 356/139.09 |

FOREIGN PATENT DOCUMENTS

| | | |
|---|---|---|
| DE | 44 19 584 | 12/1995 |
| DE | 196 23 982 | 9/1997 |
| EP | 0 120 329 | 10/1984 |
| EP | 0 766 064 | 4/1997 |
| WO | WO 98/28594 | 7/1998 |

* cited by examiner

Primary Examiner—Stephen C. Buczinski
(74) Attorney, Agent, or Firm—Young & Thompson

(57) ABSTRACT

Attitude angles of motor vehicles are measured, in particular the toe-in and camber angles or the wheels. According to the invention: a) four laser-beam measuring heads are arranged in predetermined positions, one for each wheel, so as to define an invariable spatial reference system; b) a laser beam sweeping over a plurality of horizontal planes which are situated at a relative distance from each other and which pass through the plane of the wheel is emitted by each measuring head, and a signal representing the spatial position of measurement transition points (p1, p2, pj, pn) on the said wheel is captured on the beam reflected by the surface of the wheel; c) and finally, on the basis of the spatial position of a set of said measurement points (p1, p2, pj, pn), the position of the plane of the wheel and its axis of rotation as well as the characteristic angles formed by the plane of the wheel, with respect to said spatial reference system, are calculated.

8 Claims, 1 Drawing Sheet

MEASURING ANGLES OF WHEELS USING TRANSITION POINTS OF REFLECTED LASER LINES

BACKGROUND OF THE INVENTION

The present invention relates to an apparatus for measuring, using a laser beam, the attitude angles of a motor vehicle, in particular the toe-in and camber angles of the associated wheels.

It is known that the attitude angles of a motor vehicle, in particular, as mentioned, the toe-in and camber angles of the wheels, determine the behaviour of the vehicle on the road, both as regards the so-called "road-holding" performance and the travel comfort. The importance of carrying out frequently an accurate check as to the correctness of these attitude angles is therefore obvious.

The most conventional methods for checking these attitude angles are based on measurement of the internal angles of a quadrilateral defined by measurement points, determined by means of sensing instruments applied and fixed to the individual wheels. The main drawbacks of these methods arise precisely from the fact of having to use sensing instruments fixed to the wheels, resulting, for example, in the problems or drawbacks listed below:

1. Mechanical assembly precision: possible errors during fixing of the instruments result in major measurement errors. Moreover, because of the precision required, whenever measurement must be performed, a significant portion of the testing time is used for this preliminary operation;
2. Stable fixing: the instrument for sensing, the measurement point must be fixed very firmly because, otherwise, it may be displaced during measurement and result in further errors;
3. Systematic errors during measurement: in view of the risk that the reference point on wheel may not be chosen in a sufficiently accurate manner, errors in measurement which cannot easily be controlled may arise;
4. Handling of the instruments: the instruments to be fitted must be light, so that they car be easily handled, but at the same time robust to take account of the environment in which they are used.

In order to overcome these problems, more modern methods for measuring the attitude angles have already been proposed, said methods being based on the use of opto-electronic measuring instruments which therefore do not make contact with the wheels of the vehicle or with the vehicle itself. Measuring instruments of this type have been proposed, for example, in U.S. Pat. No. 4,899,218, DE-A 2948573 and EP-A2-0,895,056.

U.S. Pat. No. 4,899,218 describes a measuring process based on the projection of a light beam with an oscillating structure onto the wheel so as to produce at least two reference images thereon; these images are read by video cameras positioned at a certain angle with respect to the optical plane defined by the plane of oscillation of the beam. The spatial position of the lines, and hence the wheel, is calculated by a processor using a known triangulation system.

DE-A-2948573 describes an apparatus in which the measuring process is based on a pair of images of the edge of the wheel rim, taken from different angles. From these images it is possible to obtain ellipses, the parameters of which may be used to determine the spatial position of the wheel, knowing the position and exact orientation of the video cameras.

EP-A2-0,895,056 describes a measuring apparatus and method consisting in obtaining a certain number of pairs of images of each wheel as the vehicle is moving towards the measurement position. The apparatus uses two video cameras for each wheel, having their lenses directed towards the measurement position and stably connected to the latter. The video cameras are connected to a processor able to process the images of each wheel viewed by them, so as to determine the spatial position of the rim by means of examination of the circular structure images and identification of the regions in which the transition between different grey levels is maximum. It is also possible to detect any wobble of the rim edge, i.e. non-perpendicularity of the plane of the wheel with respect to the associated axis of rotation, and use this to calculate the characteristic attitude angles.

All these known devices, however, are relatively complex as regards both the manufacture and initial assembly and therefore have a relatively high cost. Moreover, it does not appear—at least until now—that they have found an effective practical use.

SUMMARY OF THE INVENTION

The object of the present invention is therefore to propose a system for measuring the characteristic attitude angles of the wheels of a vehicle, which is able to overcome these problems and make the measuring operation itself easy and rapid.

BRIEF DESCRIPTION OF THE DRAWINGS

Further characteristic features and advantages of the present invention will emerge, however, more clearly from the following description of a few embodiments thereof, provided by way of example and illustrated in the accompanying schematic drawings, in which.

DESCRIPTION OF THE PREFERRED EMBODIMENTS

Figure 1:
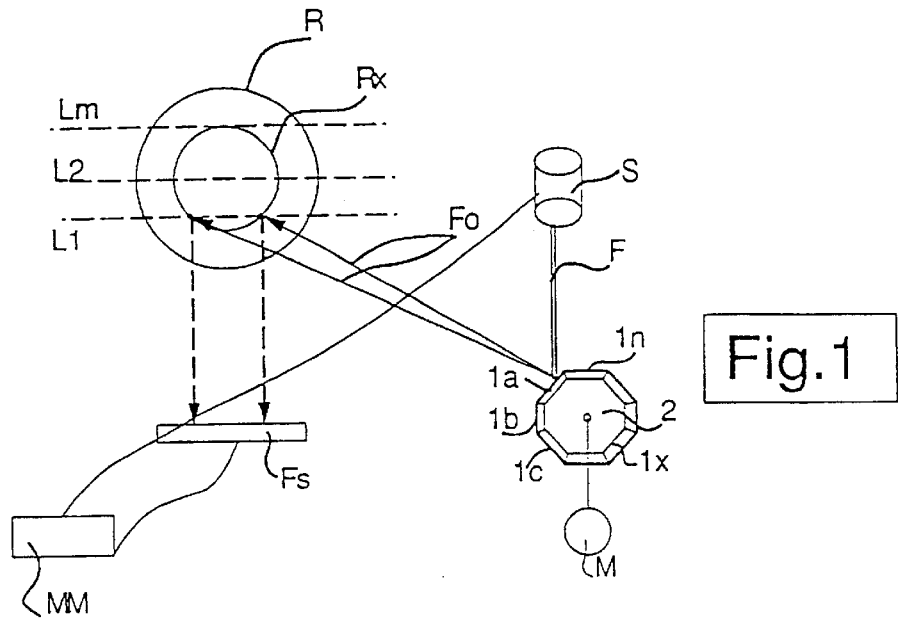
FIG. 1 shows a schematic view of the first embodiment.

As schematically shown FIG. 1, a source S emits a modulated laser beam F which strikes a mirror $1a$; the latter is mounted, together with a series of other mirrors $1b$, ... $1m$, on the periphery of a support 2 so as to form together a polygonal mirror structure. This structure is made to rotate by a stepper motor M.

More precisely, the mirrors $1a$, ... $1m$ are distributed, in a regular polygonal arrangement, on the periphery of the support 2 so as to form, relative to each other, a main angle, the amplitude of which is defined by the formula:

$$(m-2)*180°/m$$

where m is the number of sides of the polygon. Moreover, they are mounted on the support 2 so as to form also angles, with respect to the axis of rotation of the support 2, which vary from each other in a progressive manner.

This polygon mirror structure, when made to rotate, causes the modulated beam F which strikes it in a given direction to be reflected by the mirrors so as to form an oscillating beam Of which moves principally along a horizontal plane indicated by the line L1 and which intersects the wheel R of a motor vehicle (variation in the azimuth angle) and which also moves subsequently along several parallel planes, indicated by the lines L2 . . . Lm and all intersecting the wheel R (variation in the angle of elevation), for the function which will be exit more fully below.

By means of this arrangement a plurality of measurement points are then defined on the wheel, as described below.

a)—The laser measuring head sends a beam which is spot-shaped or in any case has a very small diameter towards the mirror structure which controls the direction thereof in the manner already described. The dimensions of the beam must be a compromise between the minimum dimensions which can be obtained and those which produce the minimum divergence of the beam, compatible with measurement. In fact, as known, owing to the phenomenon of diffraction, the dimensions of the beam gradually increase as it moves away from the source; more precisely, a beam which has a diameter d diverges with an angle equal to $\square/2d$. For example, a beam with an initial diameter of 1 mm and red radiation of 0.86 $\square$m widens with an angle of 0.86 mrad; at a distance of 3 m the beam has a diameter (1+3*0.86)=3.6 mm. A beam which at its origin has a diameter of 2 mm has a divergence of 0.34 mrad and, after 3 meters, has a diameter of (2+3*0.34)=3.2 mm, namely less than that of the beam initially equivalent to 1 mm. The minimum diameter of the beam is therefore chose depending on the operating distance.

b)—The laser beam is modulated so as to be able to measure the distance over it which travels. The beam reflected by the surface struck by the beam is measured in the direction of the beam itself, separating reflected component and determining the distance travelled, using a processing technique which is known per se (applied, for example, to laser telemetry) and which is therefore not described here.

c)—In addition to the distance, the intensity of the reflected radiation is also measured.

d)—Scanning is repeated, as mentioned, along several parallel planes which are indicated by the lines L1, L2 . . . Lm and which pass through the wheel and definitely intersect more than once the edge Rx of the rim, namely the line separating rim and tyre.

e)—Suitable software, which, on the one hand, controls in an instantaneous manner the orientation of the polygonal mirror structure and is therefore able to detect at each instant the direction of the laser beam and which, on the other hand, reads the measurement of the distance and the intensity, calculates for each position of the laser beam the polar coordinates of each reflected point, with respect to the position of the laser measuring head, which is taken as a fixed reference point.

f)—At the transition line between the edge of the rim and tyre, the laser signal undergoes a rapid variation as regards both the distance travelled and the intensity. On the basis of this rapid variation it is therefore possible, for each scanning line, to determine very precisely two significant points, i.e. those points (p1 . . . pn) which correspond to the pairs of values having a maximum instantaneous variation in distance and intensity. As mentioned, these points represent the positions where the beam intercepts the edge of the rim. If these two points are p1 and p2, then the spatial vectors [p1–p0] and [p2–p0] are also known, where p0 indicates the point representing the coordinates of the laser head with respect is to the fixed reference system (composed of the various laser measuring heads, one being installed for each wheel) During scanning of the beam, these significant points are memorised.

During use of the apparatus according to the invention, the position of the heads, as well as the scanning speed and angle, are predefined so that:

for each pass along a scanning plane it is possible to read at least two points on the wheel at the transition from the edge of the rim to the tyre;

it is also possible to perform scanning at a suitable speed, without the risk of not identifying the two abovementioned points; the scanning speed must be as high as possible, in keeping with the need to perform at least one distance measurement each time the laser moves by one segment equal to half its projected diameter on the wheel;

the speed of oscillation of the laser beam may be modified in an instantaneous manner so as to allow an increase in the speed of reading of the data when appropriate: for example by performing first of all a slow scanning operation in order to search for the edge of the rim over the entire scanning angle and then—once the approximate position of the edge has been determined—using slow scanning in only the zones adjacent to the edge detected and passing to fast scanning in all the other zones; as a result it is possible not only to reduce the overall scanning times, but also track movements of the vehicle and adjustments, in real time, of the wheel parameters;

it is also possible, by choosing a suitable distance of the reading head from the vehicle, to perform scanning of wheels with a different wheel base and/or gauge.

If, for each point pj determined on the edge of the rim, dj indicates the value of the distance from the position p0 of the measuring head, γj indicates the value of the azimuth angle and φj indicates the value of the elevation angle of the vector [pj–p0], it is possible to memorise, for example, for the points (p1, . . . pj . . . pn), the three values:

d1, γ1, φ1

. . .

dj, γj, φj

. . .

dn, γn, φn

Having, therefore, determined p0 with the coordinates {0, 0, 0}, the coordinates of the point defined by dj, γj, φj become:

x=dj cos γj  y=dj sin γj cos φj z=dj sin γj sin φj so that, the coordinates d0, γ0, φ0 of the laser head in a universal reference system being known, the coordinates of the point on the wheel are transformed, in the universal reference system, with the functions f, g and:

x=f(d0, γ0, φ0, dj, γj, φj)

y=g(d0, γ0, φ0, dj, γj, φj)

z=h(d0, γ0, φ0, dj, γj, φj)

and from these values {x, y, z} for each of the points (p1, . . . pj . . . pn) of a series, in the universal system, the plane which contains the profile of the rim is identified—by means of a mathematical calculation—as the plane which contains all these points. Owing to:

systematic and random errors in the measurement of the points (d1–dn);

finiteness of the measurement resolution;

accuracy in the detection of the intensity of the reflected beam, namely in determining which of the points analysed belongs to the edge of the rim;

errors resulting from incorrect interpretation of damage to the edge of the rim;

it is obviously possible that the points (p1–pn) detected do not belong to a single plane. For this reason, the plane which minimises the mean quadratic deviation between each point pj and the point p'j obtained by intersecting the respective vector [p0–pj] with this said plane is calculated first of all; then the points pj which diverge from the corresponding points p'j more than the mean quadratic deviation of these divergences are eliminated from the calculation and, finally, the plane is recalculated.

The aim of this calculation is to prevent a measurement which is particularly difficult, and therefore not very precise, from being able to modify significantly the plane defined by the other points, i.e. a kind of "majority" system.

From the various points (p1, . . . pj, . . . pn) it is also possible to obtain the centre of the circle which said points define on the plane determined above. In this case also, three points would be sufficient to identify entirely the circle; however, all the points (except for those already eliminated during the previous step for calculation of the plane) are used, and the circle which minimises the mean quadratic deviation between (p1, . . . pj, . . . pn) and the corresponding points on the theoretical circle is calculated.

Knowing the positions of the various laser measuring heads (one for each wheel), referred to a universal reference system, using simple coordinate transformation it is possible to determine the following:

1. Spatial position of the vehicle
2. Characteristic angles for the wheels
3. Relationship between angles and vehicle In order to determine precisely the transformations which associate the local coordinates with the universal coordinates (with respect to which all the angles and the position of the vehicle are calculated), it is necessary to determine the point p0 of the laser head in terms of universal coordinates. Consequently, in order to obtain an exact value of this reference point p0 or, in other words, obtain a precise spatial location of the various laser heads, the measuring system must be suitably calibrated, for example in the manner described below.

During installation of the apparatus and using appropriate instruments it is possible to perform an automatic calibration operation, using the said measuring heads in order to detect the position of the other laser heads. Certainly, when the vehicle is not present for measurement, at least the heads located on the right and on the left of the measurement position "see each other" and are therefore able to determine their relative position, using as reference points special targets which are applied, for example, to the facing surfaces of the sensor containers. The relative position of the two heads on the same side of the vehicle is kept at a known value by means of a mechanical constraint.

In addition to calibration for the relative position, during construction of the individual laser heads it is necessary to perform calibration for the measurement of the angles of the vector [pn–p0]. For this purpose a special model, similar to a Fresnel lens, is used, which simulates circles with a known radius. An acquisition software determines the calibration factors for each different simulated diameter.

In the embodiment shown in FIG. 1, the beam which is emitted by the laser head S and strikes the polygonal mirror structure is deviated along the various scanning planes L1, L2, . . . Ln towards the wheel R and reflected by the latter towards the photosensor FS connected, like the laser head S, to the measuring system MM.

Figure 2:
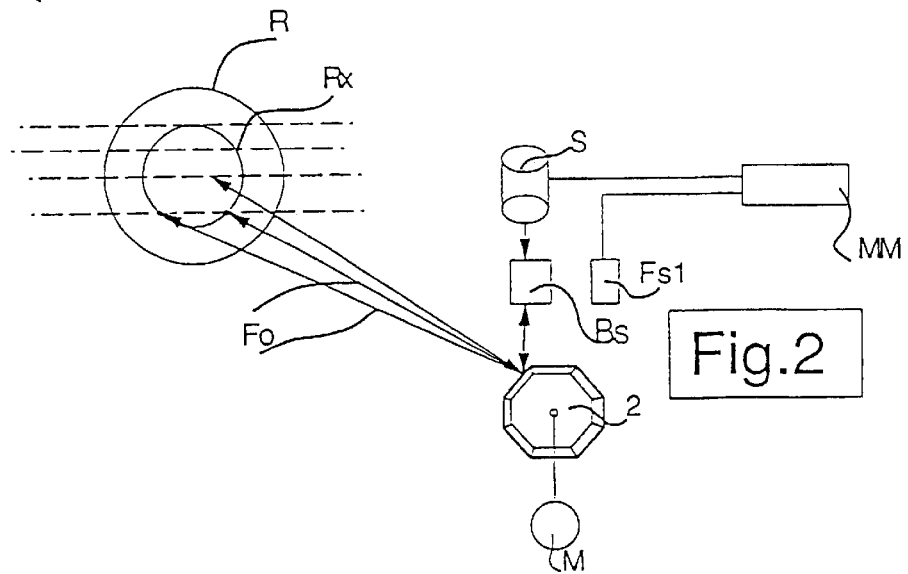
FIG. 2 shows a schematic view of a variation of embodiment.
Figure 3:
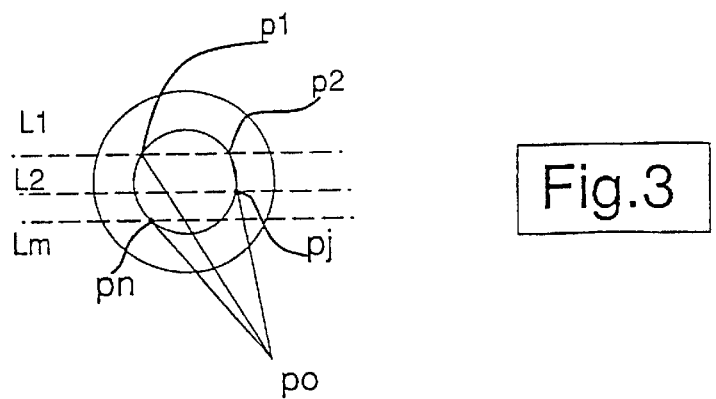
FIG. 3 is a diagram illustrating detection of the measurement points on a motor vehicle wheel.

In the case, however, of the embodiment according to FIG. 2, the beam emitted by the laser head S passes firstly through the group BS (which is a beam splitter, i.e. a polarising device which is able to separate the beam emitted from the reflected beam) and then strikes the polygonal mirror structure. It is then also deviated along the various scanning planes L1, L2, . . . Ln towards the wheel R, but is reflected by the latter again towards the polygonal mirror structure, namely along its previous travel path; it then passes through the group BS where the sole reflected beam is deviated towards the photosensor FS1 connected, like the laser head S, to the measuring system MM.

It is understood, however, that the invention must not be regarded as being limited to the particular embodiments which are illustrated above and which are merely non-limiting examples of the scope of the invention, but that various variations are possible, all of which within the grasp of a person skilled in the art, without thereby departing from the protective scope of the said invention, as defined by the claims which follow.

What is claimed is:

1. A method of measuring toe-in and camber of a vehicle wheel, comprising the steps of:

arranging a laser beam measuring head in a fixed spatial reference system, the measuring head being associated with a vehicle wheel whose toe-in and camber are to be measured;

emitting from the measuring head a laser beam that sweeps over the wheel in plural parallel detection planes that are spaced apart from each other;

modulating the laser beam and measuring a distance of the measuring head to measuring points where the plural parallel detection planes intersect a rim of the wheel; and calculating a position of a plane of the wheel relative to the fixed spatial reference system based on the measured distances.

2. The method of claim 1, wherein the step of measuring the distance comprises the step of measuring intensities of the laser beam reflected from the measuring points.

3. The method of claim 1, wherein during the emitting step, a speed at which the laser beam sweeps over the wheel in the plural parallel detection planes is a first speed until an edge of the rim of the wheel is determined and then the speed is increased to a second speed.

4. The method of claim 1, where during the measuring and calculating steps, polar coordinates of the measuring points are determined, and when all the polar coordinates of the measuring points do not all fall in a single plane, ones of the polar coordinates that are outside a mean deviation of the polar coordinates are discarded during the calculation of the position of the plane of the wheel.

5. An apparatus for measuring toe-in and camber of a vehicle wheel, the apparatus comprising:

a laser beam measuring head mounted in a fixed spatial reference system, the measuring head being associated with a vehicle wheel whose toe-in and camber are to be measured;

means for emitting from the measuring head a laser beam that sweeps over the wheel in plural parallel detection planes that are spaced apart from each other;

means for modulating the laser beam and measuring a distance of the measuring head to measuring points where the plural parallel detection planes intersect a rim of the wheel; and means for calculating a position of a plane of the wheel relative to the fixed spatial reference system based on the measured distances.

6. The apparatus of claim 5, wherein the means for measuring the distance comprises means for measuring intensities of the laser beam reflected from the measuring points.

7. The apparatus of claim 5, wherein the means for emitting comprises means for changing a speed at which the laser beam sweeps over the wheel in the plural parallel detection planes from a first speed to a higher second speed when an edge of the rim of the wheel is determined.

8. The apparatus of claim 5, wherein the means for measuring and calculating comprises means for determining polar coordinates of the measuring points, and when all the polar coordinates of the measuring points do not all fall in a single plane, for discarding ones of the polar coordinates that are outside a mean deviation of the polar coordinates during the calculation of the position of the plane of the wheel.

* * * * *